United States Patent [19]

Umland

[11] Patent Number: 5,721,336
[45] Date of Patent: Feb. 24, 1998

[54] LUBRICANT AND RELEASE AGENT FOR RUBBER

[75] Inventor: Henning Umland, Winsen/Luhe, Germany

[73] Assignee: Schill & Seilacher (GmbH & Co.), Hamburg, Germany

[21] Appl. No.: 628,553

[22] Filed: Apr. 10, 1996

[30] Foreign Application Priority Data

Apr. 19, 1995 [DE] Germany ............... 195 15 314.6

[51] Int. Cl.$^6$ ................................. C08G 63/66
[52] U.S. Cl. ............... 528/301; 528/272; 528/300; 528/301; 528/302; 106/38.22; 106/38.6; 252/11; 252/52 R; 252/56 R
[58] Field of Search ................... 528/272, 300, 528/301, 302; 106/38.22, 38.6; 252/11, 52 R, 56 R

[56] References Cited

U.S. PATENT DOCUMENTS

| 4,555,549 | 11/1985 | Camp et al. | 525/409 |
| 4,689,082 | 8/1987 | Dexheimer et al. | 106/38.32 |

FOREIGN PATENT DOCUMENTS

60-088094  5/1985  Japan.

*Primary Examiner*—Samuel A. Acquah
*Attorney, Agent, or Firm*—Collard & Roe, P.C.

[57] ABSTRACT

A lubricant and release agent for rubber is made from a polyester of a polyethylene glycol or a mixture of polyethylene glycols with an average of 3 to 20 ethylene oxide units per molecule and a linear dicarboxylic acid or a mixture of linear dicarboxylic acids with an average of 4 to 10 carbon atoms. The use of such a lubricant and release agent for reducing the surface friction and stickiness in the case of rubber is also described.

20 Claims, No Drawings

LUBRICANT AND RELEASE AGENT FOR RUBBER

BACKGROUND OF THE INVENTION

1. Field of the Invention

The present invention relates to a lubricant and release agent for rubber based on water-soluble polyesters.

2. The Prior Art

During the production and processing of rubber articles, problems frequently arise which are to be attributed on the one hand to the stickiness of the unvulcanized rubber and on the other hand to the high coefficient of friction of the vulcanized rubber. Typical examples include the sticking together of rubber sheets and pellets during storage, and the adhesion of the rubber compound to the mold during vulcanization. Also there is the high expenditure of force required during mounting and dismounting of finished rubber articles, such as e.g. tires, sealing rings and window profiles, from the mold.

For the aforementioned reasons, rubber surfaces and the surfaces of the metal parts or molds which come into contact with the rubber are frequently treated with lubricants and release agents. The following product groups and preparations containing these lubricants and release agents are as follows:

solids (e.g. mica, talc, graphite, zinc stearate);
anionic surfactants (e.g. soaps, sulphonates);
non-ionic surfactants such as silicone oils;
resins, cellulose derivatives, polyacrylates and the like; and
polyethers.

Examples of the group of polyethers include polyethylene glycols and ethylene oxide/propylene oxide copolymers (EO/PO copolymers) and their alkyl and aryl ethers which have essentially been used previously (See U.S. Pat. No. 4,555,549, U.S. Pat. No. 4,689,082, and Japanese Patent No. 60-088094).

Higher-molecular-weight polyethylene glycols are effective release agents but, because of their hard wax-like state at normal ambient temperature, can be used as external lubricating agents only to a limited extent. On the other hand, the low-molecular-weight types, which are liquid at room temperature, do not form a sufficiently load-bearing lubricant film in the case of common applications, because of their relatively low viscosity.

The EO/PO copolymers include types which have viscosities, pour points and temperature-viscosity patterns such that they are suitable as lubricants and release agents over a wide temperature range, particularly since they have a minimal swelling effect on most rubbers. Their use is however becoming increasingly limited by statutory regulations because of their known extremely slow biological degradation, or biodegradability, in sewage treatment plants. This is caused by their branched chain structure. Also, in many applications the lubricant and the release agent is washed away with water after use and the wash water is then fed to a waste water treatment facility.

SUMMARY OF THE INVENTION

It is an object of the present invention to provide a liquid, water-soluble lubricant and release agent which largely corresponds to the known EO/PO copolymers in terms of industrial application properties and which is capable of replacing them, but which is also readily biologically degradable or has biodegradability, in sewage treatment plants and thus, after rinsing with water, requires no special treatment.

This object is achieved according to the present invention by a lubricant and release agent which comprises a polyester reaction product of a polyethylene glycol or a mixture of polyethylene glycols with an average of 3 to 20 ethylene oxide units per molecule and a linear dicarboxylic acid or a mixture of linear dicarboxylic acids with an average of 4 to 10 carbon atoms per molecule.

DETAILED DESCRIPTION OF PREFERRED EMBODIMENTS

It has surprisingly been found in a first embodiment that a polyester product which is produced by the esterification reaction of a polyethylene glycol having 3 to 20 ethylene oxide units per molecule or of a mixture of polyethylene glycols with an average of 3 to 20 ethylene oxide units per molecule, preferably 4 to 12 ethylene oxide units per molecule, in particular 8 ethylene oxide units per molecule with a linear dicarboxylic acid having 4 to 10 carbon atoms per molecule or a mixture of linear dicarboxylic acids with an average of 4 to 10 carbon atoms per molecule, preferably 5 to 8 carbon atoms per molecule, more preferably 6 carbon atoms per molecule meets the requirements listed above in an excellent manner.

In another embodiment, a mixture of such a polyester with up to 10 parts by weight of polyethylene glycol according to the above definition to one part by weight polyester, i.e. polyethylene glycol: polyester $\leq 10:1$, preferably $\leq 5:1$, in particular $\leq 1:1$, meets these requirements in an excellent manner.

Moreover, to optimize the industrial application properties, up to 5% by weight of conventional additives (e.g. corrosion inhibitors, stabilizers, antioxidants) can also be added. An example of a corrosion inhibitor is an alkanol amine such as triethanol amine. An example of an antioxidant is polymerized 1,2-dihydro-2,2,4-trimethyl quinoline.

Generally speaking, the polyethylene glycols or the mixtures thereof, have the formula, $H(OC_2H_4)_nOH$, wherein n is from 3 to 20, preferably 4 to 12, and in particular 8, or for a mixture n is an average from 3 to 20, preferably 4 to 12, and in particular 8.

Suitable examples of linear dicarboxylic acids of 4 to 10 carbon atoms include linear alkanedioic acids of 4 to 10 carbon atoms such as adipic acid, glutanic acid, malonic acid, oxalic acid, and succinic acid as well as linear alkenedioic acids of 4 to 10 carbon atoms such as citraconic acid, fumaric acid, and maleic acid, or the mixtures thereof.

The dynamic viscosity of the entire formulation can be varied within wide limits on the one hand through varying the molecular weight of the polyester and on the other hand through the admixing of the polyethylene glycol. The dynamic viscosity can thus be matched in each case to the requirements of the individual usage. At a temperature of 20° C., the dynamic viscosity generally ranges from 500 to 15,000 mPas, preferably 1,000 to 10,000 mPas (measured according to DIN 53019).

The prior art biologically degradable polyethylene glycols are either too thinly liquid at room temperature (polyethylene glycol 400 has a dynamic viscosity of about 110 to 120 mPas at 20° C.) or are already solid at room temperature (polyethylene glycol 600 has a solidification point of about 17° C. to 22° C.). In contrast to these prior art glycols, the polyesters and polyester-glycol mixtures described for the present invention can be formulated such that products which are liquid at room temperature will have the viscosity required for the specific application that is desired.

3

Other objects and features of the present invention will become apparent from the following Examples, which disclose the embodiments of the present invention. It should be understood, however, that the Examples are designed for the purpose of illustration only and not as a definition of the limits of the invention.

EXAMPLE 1

9 mol of adipic acid and 10 mol of commercial polyethylene glycol 400 were esterified with one another at 235° C. in a flask with attached distillation condenser and receiver until no more reaction water was formed. Esterification was then continued at the same temperature under water jet pump vacuum until the acid value of the reaction product had dropped to 3 mg KOH/g. The thus-obtained water-soluble polyester had a dynamic viscosity of 15,000 mPas at 20° C. (measured according to DIN 53019).

EXAMPLE 2

50 g of the polyester produced according to Example 1 were mixed with 49 g of polyethylene glycol 400, 0.8 g of triethanolamine (corrosion inhibitor) and 0.2 g of polymerized 1,2-dihydro-2,2,4-trimethyl quinoline (TMQ, antioxidant). The dynamic viscosity measured at 20° C. according to DIN 53019 was 2000 mPas. The pour point according to DIN ISO 3016 was about 0° C.

EXAMPLE 3

60 g of the polyester produced according to Example 1 above were mixed with 39 g of polyethylene glycol 400, 0.8 g of triethanolamine and 0.2 g of TMQ. The dynamic viscosity of the mixture, measured at 20° C. according to DIN 53019, was 4,000 mPas. The pour point according to DIN ISO 3016 was about 0° C.

The products of Examples 1 to 3 were tested as lubricants and release agents during the vulcanization of rubber articles made of EPDM (ethylene-propylene-dienemonomer) and EAM (ethylene-acrylate-monomer) rubber and showed a very satisfactory performance in each case. In particular, even after many cure cycles at 180° C., there was no tendency towards the formation of coke-type or resin-type deposits on the mold as a result of thermal decomposition. Swelling of the rubber by the lubricant and release agent could not be observed. All three products were easily washed off with tap water after use.

In a further test, the biological degradibility of the mixture according to Example 2 was investigated. The test was carried out in accordance with the "OECD Guidelines For Testing Of Chemicals; Ready Biodegradability: Closed Bottle Test 301 D" of 17th Jul. 1992.

The biodegradability determined under the conditions of the test procedure was 71% after 28 days, and values above 60% are rated as good. The control substance sodium acetate, also investigated in the test series, showed a biological degradability of 77%.

In contrast, it is known that the biological degradability of the known prior art EP/PO copolymers is so low that it is practically negligible.

While several embodiments of the present invention have been shown and described, it is to be understood that many changes and modifications may be made thereunto without departing from the spirit and scope of the invention as defined in the appended claims.

What is claimed is:

1. Lubricant or release agent for rubber, comprising a polyester of a polyethylene glycol having from 3 to 20 ethylene oxide units per molecule or a mixture of polyethylene glycols with an average of 3 to 20 ethylene oxide units per molecule; and a linear dicarboxylic acid with an average of 4 to 10 carbon atoms or a mixture of linear dicarboxylic acids with an average of 4 to 10 carbon atoms.

2. Lubricant or release agent according to claim 1, wherein the polyethylene glycol has 6 to 12 ethylene oxide units or the mixture of polyethylene glycols has an average of 6 to 12 ethylene oxide units and the dicarboxylic acid has 5 to 8 carbon atoms or the mixture of dicarboxylic acids has an average of 5 to 8.

3. Lubricant or release agent according to claim 1, wherein the polyethylene glycol has 8 ethylene oxide units or the mixtures of polyethylene glycols has an average of 8 ethylene oxide units and the dicarboxylic acid has 6 carbon atoms or mixture of dicarboxylic acids has an average of 6 carbon atoms.

4. Lubricant or release agent according to claim 1, further comprising a polyethylene glycol having 3 to 20 ethylene oxide units or a mixture of polyethylene glycols with an average 3 to 20 ethylene oxide units in a polyethylene glycol/polyester weight ratio of $\leq 10:1$, as mixing component.

5. Lubricant or release agent according to claim 1, further comprising a polyethylene glycol having from 6 to 12 ethylene oxide units, or a mixture of polyethylene glycols with an average 6 to 12 ethylene oxide units in a polyethylene glycol/polyester weight ratio of $\leq 10:1$, as mixing component.

6. Lubricant or release agent according to claim 1, further comprising a polyethylene glycol having 8 ethylene oxide units, or a mixture of polyethylene glycols with an average of 8 ethylene oxide units in a polyethylene glycol/polyester weight ratio of $\leq 10:1$, as mixing component.

7. Lubricant or release agent according to claim 4, wherein the polyethylene glycol/polyester weight ratio is $\leq 5:1$.

8. Lubricant or release agent according to claim 4, wherein the polyethylene glycol/polyester weight ratio is $\leq 1:1$.

9. Lubricant or release agent according to claim 1, wherein the polyethylene glycol component of the polyester or the polyethylene glycol further added to the polyester comprises polyethylene glycol 400.

10. Lubricant or release agent according to claim 9, wherein the polyethylene glycol component of the polyester and the polyethylene glycol further added to the polyester comprises polyethylene glycol 400.

11. Lubricant or release agent according to claim 1, wherein the dicarboxylic acid component of the polyester comprises adipic acid.

12. Lubricant or release agent according to claim 1, further comprising at most 1% by weight antioxidant.

13. Lubricant or release agent according to claim 12, wherein the antioxidant comprises polymerized 1,2-dihydro-2,2,4-trimethyl quinoline.

14. Lubricant or release agent according to claim 1, further comprising at most 4% by weight corrosion inhibitor.

15. Lubricant or release agent according to claim 14, wherein the corrosion inhibitor comprises an alkanolamine.

16. Lubricant or release agent according to claim 1, wherein the dynamic viscosity of the entire formulation at 20° C., determined according to DIN 53019, is between 500 and 15,000 mPas.

17. Lubricant or release agent according to claim 1, wherein the dynamic viscosity of the entire formulation at 20° C. determined according to DIN 53019, is between 1,000 and 10,000 mPas.

18. In a method for reducing the surface friction and stickiness of rubber, the improvement which comprises utilizing the lubricant or release agent according to claim 1 for said reducing.

19. In a method for reducing the surface friction and stickiness during the vulcanization of rubber articles, the improvement which comprises utilizing the lubricant or release agent according to claim 1 for said reducing.

20. A lubricant or release agent for rubber comprising a polyester reaction product of a polyethylene glycol, or mixture of polyethylene glycols, having the formula $H(OC_2H_4)_nOH$, wherein n is from 3 to 20; and a linear dicarboxylic acid selected from the group consisting of linear alkanedioic acids of 4 to 10 carbon atoms, linear alkenedioic acids of 4 to 10 carbon atoms, or the mixtures thereof.

* * * * *